E. H. SHEETS.
APPARATUS FOR OBTAINING LIQUID HYDROCARBONS.
APPLICATION FILED JUNE 27, 1916.
1,273,191.
Patented July 23, 1918.
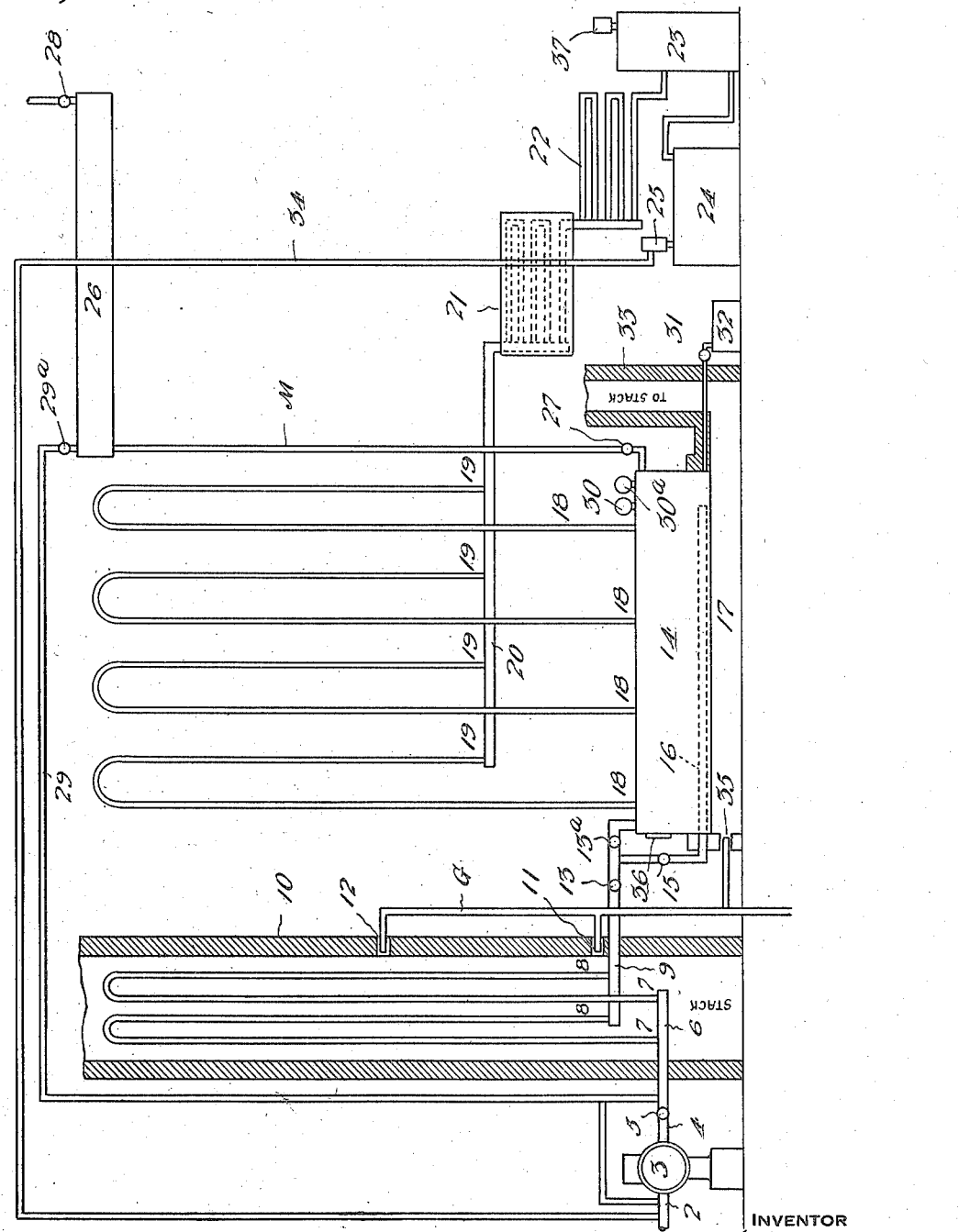
WITNESS:
E. B. Schwartz
INVENTOR
Earl H. Sheets
BY Edson B...
ATTORNEYS

UNITED STATES PATENT OFFICE.

EARL H. SHEETS, OF MUSKOGEE, OKLAHOMA.

APPARATUS FOR OBTAINING LIQUID HYDROCARBONS.

1,273,191. Specification of Letters Patent. Patented July 23, 1918.

Application filed June 27, 1916. Serial No. 106,087.

*To all whom it may concern:*

Be it known that I, EARL H. SHEETZ, a citizen of the United States, residing at Muskogee, in the county of Muskogee and State of Oklahoma, have invented certain new and useful Improvements in Apparatus for Obtaining Liquid Hydrocarbons; and I do hereby declare the following to be a full, clear, and exact description of the invention, such as will enable others skilled in the art to which it appertains to make and use the same.

This invention is an apparatus for blending natural gas, liquified gas and gasolene for the recovery of volatile hydrocarbons from crude oil and natural gas, and relates more particularly to the recovery of gasolene.

It is well known that oil well owners and natural gas well owners suffer great losses, due to the escape of volatile products from the wells. Natural gas, as delivered at oil wells, frequently carries a volume of light oils, particularly gasolene, and it has been found also that natural gas has a great affinity for gasolene and other volatile hydrocarbons.

The invention relates to a new and useful process for collecting, compressing, heating and mixing gas and oil vapors from gas and oil wells, as well as gas and oil vapors from crude and refined storage tanks, which gases and vapors are converted by the system of compressing, heating, mixing and cooling, under pressure, into a commercial fuel, suitable for use in motors and internal combustion engines.

A purpose of the invention is to prevent waste which occurs in the ordinary methods of compressing and mixing gas and kerosene.

It is an object of the invention to manufacture a commercial fuel for use in motors and internal combustion engines by means of a process or system which can be operated economically and installed in units for different sized plants.

A further object of the invention is to provide a great saving over previous methods known to me, by a system of heating and reheating gas, and mixing the same with heated oil and vapors, thereby permitting a small lease owner of oil or gas lands to save all of his waste gases and evaporations and permit him to transfer his crude oil and vapor production into a commercial fuel for the use of motors and internal combustion engines and thereby give him a much greater profit than he would otherwise obtain from his well leases.

A still further object of the invention is to save the gases and vapors that would otherwise be lost in carrying out a system or process of this character and conducting such gases and vapors back to the initial steps in the process to be mingled with the fresh gases and vapors from a well.

Broadly stated, the invention comprises the introduction of gas and oil vapors from a well to a compressor and heating the compressed vapors before introducing them to a blending tank into which is introduced crude oil and blending oils, such as naphtha, gasolene or like substances. The material in the blending tank is heated to a high degree, and the gases, vapors or lighter products from the material so heated are conducted through risers or vertical tubes to cooling receptacles or coils, the heavier products falling back in such tubes into the tank, thereby preventing the heavier product from passing out of the blending tank or still until it is transformed into a merchantable fuel. Provision is made for preventing the caking of the substance in the blending tank or still and to collect the residue from the tank. The invention also contemplates the saving of the heat and gases which pass up the flue after heating the material in the blending tank and conducting such heat and gases to the stack to assist in heating the pipes containing the vapors and gases from the wells. The invention further includes the conduction of vapors and gases, rising from the storage tanks and receptacle which would otherwise be permitted to escape and be lost, to the line connected with the compressor, and the compressed gas heating tubes to be again introduced into the blending tank to produce a cycle of operations and eliminate waste of valuable substances by the cyclic course described. By my process, it has been found that the oil used for blending can be of much lower gravity than that used in the ordinary methods of mixing naphtha and natural and liquefied gases, and much larger quantities of gasolene can be produced.

For the purpose of illustrating an apparatus in which the process of this invention may be carried out, there is submitted herewith a schematic drawing disclosing the essential elements to such a process.

Gas or oil vapors from gas or oil wells, or any other suitable source of supply, are drawn through a vacuum line 2 to a compressor indicated at 3. The gases and vapors are then compressed and passed into the line or pipe 4 leading from the compressor to a header 6, preferably through a valve indicated at 5 positioned in the pipe 4. The header 6 is shown provided with a plurality of vertical tubes 7 which have return portions, indicated at 8, which connect with another header indicated at 9, the header 9 being shown in the drawing as positioned slightly above the header 6. These vertical tubes 8 are mounted in a suitable device, shown as a stack 10, where they can be readily heated in order to heat and expand the gases and vapors which are carried into these tubes from the compressor 3. The heating may be effected by any suitable means, and in the drawing, it is shown as accomplished by a plurality of nozzles 11, 12, furnished by a gas supply pipe G, whereby the gases and vapors will be heated on a plurality of occasions in passing up and down the tube sections 7 and 8 from header 6 to header 9.

The header 9 is shown provided with a valve 13 which controls the passage of heated and compressed gases and vapors from the header 9 to a mixing tank 14. This tank 14 is shown as a horizontally mounted element arranged to receive the heated and compressed gases from header 9 through a plurality of branches, one branch admitting the gases and vapors at the upper portion of the tank 14, and controlled by a valve 13ª, while the other branch admits the gases and vapors to the bottom of the tank 14 through a tube 16 which extends longitudinally of the tank and which may be provided with perforations or nozzles directed toward the bottom of the tank whereby when the gases and vapors are introduced, under pressure, into the tank 14, which may contain a mixture or blending of crude oil with other hydrocarbon substances, will serve to agitate this mixture and prevent the substances from caking at the bottom of the tank 14. The amount of gases and vapors introduced through tube 16 may be controlled by a valve 15.

It is desired to heat the substances introduced into the mixing tank 14, and to accomplish this purpose, the horizontal mixing tank or still is equipped with a furnace, indicated at 17. It has been found that by introducing oil and gas vapors and compressing them, then heating the gases and vapors in the stack 10 before introducing them into the blended materials in the mixing tank 14, satisfactory results can be obtained.

The mixing tank 14 is preferably provided with a plurality of vertical tubes 18 which may extend from the upper portion of the tank 14 for a distance of 10 to 20 feet or more, and these tubes are thence directed downwardly to form the tube sections 19 which connect with a header 20. This header 20 empties into a plurality of cooling coils which may be positioned or emerged into a tank or water box indicated at 21. It is obvious that any number of these tanks or boxes 21 may be employed. Connected with the coils in the tank or box 21, are other coils 22 which may be subjected to a water spray or may be air cooled, or may be sprayed with water and simultaneously have air passed around the coils, in order to reduce the temperature of the heated and expanded gases and vapors and to condense such gases and vapors to a liquid. It is preferred that the temperature of the gases and vapors be reduced to 70 or 80 degrees before the fuel is passed from the coils 22 to the accumulating tank or tanks 23. The fuel may be maintained in the accumulating tanks at high pressure if desired, and may be conducted from the accumulating tanks to stock tank 24 and reduced to atmospheric pressure. The stock tank 24 may be provided with a valve 25 through which the evaporations and gases from the stock tank may be conducted back to the compressor where such gases and vapors may be commingled with the gases and vapors from the wells to be compressed, heated and returned through the system, making a cycle of operation without loss and waste of the gases and vapors from the stock tanks.

The mixing tank 14 is supplied with substances to be treated from a gravity tank 26 which may be placed above the mixing tank and connected therewith by any suitable means, such as a pipe M having a valve 27 which controls the passage of fluid from the gravity tank 26 to the mixing tank 14, or the material may be supplied from a tank 26 to the mixing tank 14 by pumping the substance from one tank to the other, such pump not being shown in the drawing. The tank 26 may be supplied in any suitable manner through a pipe which is controlled by the valve 28, and vapors emanating from tank 26 are drawn through the pipe 29 having a check valve 29ª, to the pipe 2 by the compressor, in order that the vapors or gases may be carried through the system as previously described.

The mixing tank may be kept about half full of oil, and may be equipped with temperature and pressure gages of any desired form. The temperature gage may be positioned in the space indicated at 30 and the pressure gage in the space indicated at 30ª.

The residue or refuse from the tank 14 may be drawn off through a connection 31 to a residuum tank 32.

The products of combustion in the furnace 17 are carried off through a flue 33, and such products of combustion are carried, in any suitable manner, not shown, to the stack 10, where the heat may be utilized in heating the contents of the tubes 7 and 8 positioned within the stack.

A line of pipe may extend from valve 25 of the stock tank 24 to the vacuum line 2 which connects with the compressor, whereby the vapors from the stock tank 24, which are ordinarily allowed to escape, are collected and passed through the system.

The furnace 17 may be heated in any suitable manner, one form of which is shown by providing burners or nozzles 35 leading from the gas line G.

If desired, the mixing tank 14 may be provided with a gage 36 for the purpose of determining the amount of oil within the mixing tank or still.

The accumulating tank 23 may be provided with a relief valve 37 for the purpose of regulating the pressure within this tank.

Gas and oil vapors from natural gas and oil wells, and what is known as "casing-head gas" are conducted through the vacuum line to the compressor where they are compressed and partly liquefied and thence the liquids, gases, and vapors are carried to the vertical highly heated tubes where the substances are expanded to such a degree that the fluid substances are united and the gases prevented from evaporating when exposed to atmospheric pressure.

The mixing tank or still 14 is partly filled with blending oils from the gravity tank 26. Said blending oils may be crude oil, naphtha, gasolene, or other hydrocarbons. The mixture within the tank 14 is heated to the desired temperature, and the compressed gas and oil vapors are introduced into the tank from the tubes 8, some of the vapors being introduced above the mixture in the tank, while the remaining portion of the vapors are conducted, under pressure, through the tube 16 to be injected into the blended substances near the bottom of the tank to assist in cracking the blended oils and thoroughly mixing the heated gases and vapors with the blending oils. The commingling or welding of the gases and vapors with oils, under heat and pressure, increases the volume of the liquid substances produced by the apparatus.

The vapors and gases arising from the heated mixture within the tank 14 are conducted upwardly through pipes 18 for a predetermined distance, say from 10 to 20 feet or more, to permit the heavier substances carried by the vapors to drop back into the tank and to be reheated and further broken up. The lighter gases and vapors are carried over the bend of the tubes 18 and conducted out by means of the header 20 to the cooling coils which are emerged in the tanks or water boxes 21, where the gases and vapors are cooled to condense the same. From the coils 21, the gases, vapors and such liquid as may have been formed are conducted to the water spray and air cooled coils which empty into the accumulating tank 23, which is provided with the relief valve 37 for regulating the pressure in the tank. From the accumulating tank, the fuel is carried to the stock tank 24 where it is reduced to atmospheric pressure, and the gases and vapors and evaporations from the stock tank are returned by means of the pipe line 34 to the vacuum line 2 to be again sent through the compressor, heated, and conducted through the system, thereby saving the substances which have been formerly permitted to go to waste.

Admitting the heated compressed gases and vapors to the bottom of the mixing tank, not only assists in cracking the blending oil but keeps the oil in the tank constantly in motion and thereby prevents the heavier portions of the oil from settling, caking, and burning at the bottom of the mixing tank or still.

The heat and waste gases from the furnace 17 are conducted up the flue 33 and thence to the stack 10 where they may be utilized in heating the tubes 7, 8.

Having thus described my invention, what I claim is:—

1. An apparatus of the class described comprising a mixing tank having a plurality of vertically arranged vapor tubes, each having a bend to form returned tubes which are connected with a header, whereby the heavier substances may be returned to the tank and the lighter substances carried away from the tank, an oil supply tank for the mixing tank, means to heat the mixing tank, a compressor, gas heating tubes connected with the compressor and the mixing tank, and means to conduct gases and vapors from the supply tank, and also gases and vapors from other sources to the compressor, to be compressed, expanded, and commingled with the oil in the mixing tank under heat and pressure to thereby cause combination of the gases and vapors with the liquid substances as a part of said substances.

2. In an apparatus of the class described, a compressor, a stack having a plurality of vertically arranged gas heating tubes connected with the compressor, means to connect said tubes with a mixing tank, said mixing tank being provided with vertically arranged vapor tubes, cooling coils connected with said vapor tubes, a stock tank to receive substances from the vapor tubes and means of connection between the stock tank and the tubes of the compressor, whereby the evaporations from the stock tank may be conducted to the compressor.

3. In an apparatus of the class described, a mixing tank, a stack provided with vertically arranged vapor tubes, means to heat the tubes in the stack, one end of said tubes being provided with a header having a plurality of connections with the mixing tank, and a plurality of valves controlling the passage of heated and expanded vapors and gases from the vapor tubes to the upper and lower portions of the mixing tank.

In testimony whereof, I affix my signature, in presence of two witnesses.

EARL H. SHEETS.

Witnesses:
J. H. BACON,
A. A. AVERY.